Patented May 23, 1933

1,909,996

UNITED STATES PATENT OFFICE

HOWARD ADLER, OF CHICAGO HEIGHTS, ILLINOIS, ASSIGNOR TO VICTOR CHEMICAL WORKS, OF CHICAGO, ILLINOIS, A CORPORATION

METHOD OF CONVERTING FERRO-PHOSPHORUS INTO PHOSPHATES

No Drawing. Application filed September 30, 1931. Serial No. 566,182.

The present invention relates to an improved process for the conversion of ferro-phosphorus into trisodium phosphate and more particularly to an improvement on the method disclosed in the co-pending application of Lindberg and Toubes, Serial No. 506,303, which was filed on January 2, 1931, and assigned to the Victor Chemical Works.

The principal object of this invention is to effectively control chemically the manufacturing process for the conversion of ferro-phosphorus into trisodium phosphate.

Another object of this invention is to provide a process for the production of trisodium phosphate in which the alkalinity of the leaching medium is definitely controlled so that undesirable reactions of reversion shall not occur.

A further object of this invention is to provide a trisodium phosphate of constant chemical composition produced by conversion from ferro-phosphorus.

In the manufacture of trisodium phosphate from ferro-phosphorus according to the Lindberg and Toubes process, it has been the practice to heat a mixture of soda-ash and ferro-phosphorus, wet with sodium phosphate solution, in a suitable furnace to a temperature below fusion. The products of this reaction are trisodium phosphate and magnetic iron oxide, obtained in the form of a clinker. These two products are then separated by dissolving the soluble phosphates and effecting a separation from the insoluble iron oxide suitably first by settling, then by centrifugal clarification of the decanted liquor, and finally by filtration. In the operation of this process, the clinker is quenched in weak phosphate liquor and after it has been increased to a strength of approximately 36° Bé., the mixture is allowed to settle. The trisodium phosphate solution is decanted from the residue and then prior to clarification and filtration, additional alkali is added in order to expedite the clarification. It has been the practice to add an amount of alkali equivalent to 1 to 2% based on the weight of the solution.

Variable results are sometimes obtained in the operation of the aforementioned process due to variations in the chemical composition of the clinker which is produced and undesirable reactions of reversion in the leaching medium, thereby retarding subsequent clarification and filtration operations. It is found that the previously mentioned variations appear most clearly in differences in the amount of finely divided solids remaining in suspension in the liquor which is decanted from the iron oxide residue. One method of testing the clarity of the decanted liquor is to determine the percentage of solids contained in a definite volume of the decanted liquor. Under conditions of normal operation, this will amount to 10–15 grams of solids per 250 cubic centimeters of liquor having a strength of about 36° Bé. However, under less satisfactory operating conditions, the solid content may be increased to 30–40 grams per 250 cubic centimeters of liquor. The variations are caused to a considerable extent at least by unavoidable variations in the furnace operation and in the relative proportions of soda-ash and ferro-phosphorus passing through the furnace. For example, when there is an excess of ferro-phosphorus present in the furnace, there is produced, in addition to the mixture of trisodium phosphate and magnetic iron oxide, a quantity of ferric phosphate. When clinker containing this compound is dissolved in the previously described leaching process, the ferric phosphate reacts with caustic alkali in the leaching liquor, forming ferric hydroxide and thereby reducing the alkalinity of the leaching liquor. When the alkalinity of the leaching liquor is reduced excessively, the magnetic iron oxide becomes hydrated and forms ferric phosphate by an undesirable reaction of reversion. This reversible reaction causes thickening of the mixture being treated and renders it difficult to produce satisfactory settling of the leaching charges, thus complicating the subsequent clarification and filtration operations. Consequently, some practical means of preventing the occurrence of the above-mentioned reaction is highly desirable.

It has been found that these undesirable conditions of operation may be prevented and wide variations in clinker composition compensated for by adding sufficient alkali, suitably as caustic soda, to a mixture of phosphate mother liquor and weak liquor so that the alkalinity of the leaching solution thereby formed is greater than the alkalinity of trisodium phosphate formed when the mixture of magnetic iron oxide and phosphate is subsequently added to the leaching solution; and preferably, the amount of alkali employed is such that when the leaching of the charge is complete, the liquor will contain an excess of alkali suitably from 1 to 2% in the case of caustic soda, over that contained in a solution of ordinary trisodium phosphate of the same $P_2O_5$ content.

It has been found, by experiment, that the alkali required should be added to the leaching charges so that the liquor, after the charge is complete, should have an alkalinity factor exceeding 1.06, and preferably about 1.075 to 1.10, as determined by the hereinafter described method.

It has been found convenient to express the alkalinity of a solution of alkaline phosphate in terms of a factor which may be determined by means of an acid titration of the alkaline solution employing phenolphthalein and methyl orange as indicators, as follows. A sample of the clear solution is titrated with N/5HCl, first utilizing phenolphthalein as the indicator and after the end point has been reached, employing methyl orange as the second indicator. For example, it may be assumed that the titration of a sample of alkaline solution to the phenolphthalein end-point gave a reading of 17.0 cubic centimeters and the total titration to the methyl orange end-point was 30.5 cubic centimeters. The alkalinity factor heretofore referred to, is given by the following formula:

$$F = \frac{2(T-Ph) + Ph}{3(T-Ph)}$$

where T represents the total titration to methyl orange and Ph indicates the titration to phenolphthalein. In the example stated above, Ph=17.0 and T=30.5. Therefore, $$F = \frac{2 \times 13.5 + 17.0}{3 \times 13.5} \text{ or } \frac{44}{40.5}, \text{ which} = 1.085.$$

When trisodium phosphate crystals are dissolved in water and titrated, according to this method, they will usually give a factor of 1.06. It was found that variations in the chemical composition of the clinker produce correspondingly wide variations in the alkalinity factor. For example, it was found that on solution in hot water, the alkalinity factor ranged from 0.75 to 0.90 in the case of clinker having a large excess of ferro-phosphorus to values of 1.12 to 1.15 with clinker containing a large excess of soda-ash. In general, however, it is desirable to control the hereinafter described manufacturing process so that clinkers of as near normal composition as possible may be obtained; that is, with an alkalinity factor of 0.98–1.00.

In accordance with the present invention, the ferro-phosphorus, which may vary from 10 to 30% phosphorous content and in general is preferably from 22 to 26% phosphorus, is ground very finely, say to about 200 mesh and is then mixed with an alkali metal carbonate, such as potassium carbonate, sodium carbonate or the like and preferably the latter, in reacting proportions, for example, 44% of ferrophosphorus containing 26% P and 56% soda-ash. It has been found that segregation of the constituents of the mixture, which tends normally to occur, may be avoided by moistening the mixture with small proportions, say up to 10 or 15% of the weight of the mixture, with water or dilute alkali metal phosphate solution such as is secured in later stages of the process. When water is employed, while segregation of the constituents of the mixture is effectively avoided, there becomes apparent a tendency of the mixture to cake and harden, which is disadvantageous in the further steps of the operation. By employing a dilute sodium phosphate liquid, such as is derived in the later stages of the process, the segregation of the constituents of the mixture of ferro-phosphorus and alkali metal carbonate is effectively prevented and at the same time there is no tendency for the resulting mixture to cake and harden. The solution thus employed may be from 1 to 5° Bé., or even higher in strength, although concentrations above 3° to 5° Bé. are not necessary. It is preferred to employ weak phosphate liquors derived from the process as hereinafter described, and ranging from 1 to 3° Bé., since their use has, in addition to the advantages hereinbefore stated, the further advantage of preventing accumulations of water in the operating system.

The mixture is then heated or roasted in an oxidizing atmosphere to a reacting temperature below the fusion point of the mixture in any suitable device such as an open hearth furnace, a rotary furnace or the like. The temperature to which the mixture is heated is preferably between 1000° and 1100° C., although somewhat lower temperatures, say down to 900° C., or somewhat higher temperatures not causing fusion of the mixture may be employed. The heating of the mixture is continued, preferably without appreciable or apparent fusion, until reaction is completed.

An alkaline leaching liquor, having the desired alkalinity as above set forth is then prepared in a suitable settling tank prior to the discharge of the hot clinker or reacting mixture therein. The leaching liquid may be prepared by adding the required amount of alkali to water or to a dilute solute of sodium phosphate, such as is secured in later stages of the process; for example, by mixing the following ingredients; 1571 parts, by volume, of weak phosphate liquor having strength of about 14° Bé., and an alkalinity factor of 1.03, 1197 parts, by volume, of mother or concentrated phosphate liquor having a strength of about 22° Bé., and an alkalinity factor of 1.08, and 77.3 parts, by volume, of caustic soda solution containing 5.43 pounds of sodium hydroxide per gallon and having a strength of 47° Bé. These ingredients are mixed by stirring, and to the resulting leaching liquor, there may be added 3.10 to 3.15 pounds of clinker per gallon. In this way, the clinker is always in the presence of a quantity of caustic soda at least greater than that required to produce trisodium phosphate. With a typical clinker containing 24.1 to 24.3% total $P_2O_5$ and having an alkalinity factor of 0.98 to 1.00, the resulting liquor had an alkalinity factor of 1.08.

The contacting of the reaction mixture while hot with the leaching liquid modifies both the physical and chemical characteristics of the insoluble residue of the mixture, which is largely iron oxide, as indicated in the prior application of Lindberg et al. above referred to. If the reaction mixture, however, is contacted while hot from the furnace with the leaching liquid, the iron oxide residue is black in color and settles better and more rapidly than the brown iron oxide residue secured in the cold contacting or leaching operation. The hot contacting or leaching operation with a strongly alkaline solution has the further advantage of preventing the formation of ferric hydroxide and substantially prevents the thickening of the mixture while being leached, and facilitates the subsequent clarification and filtration operations.

The mixed sodium phosphate liquor employed with the caustic alkali in the above mentioned leaching liquor may be obtained by mixing mother liquor from the subsequent crystallizing operation for the phosphate product with wash liquors derived from the process, such as the first liquor from the washing of the iron oxide residue from the initial leaching operation. The mother liquor so employed will range from 20 to 25° Bé., the two being mixed with the caustic alkali to give a leaching liquor containing the desired proportions of excess alkali as hereinbefore set forth.

After contacting with the phosphate liquor containing caustic soda, the reaction mixture from the reaction between the ferrophosphorus and soda ash, the iron oxide residue is permitted to settle and the liquor drawn off, the latter, after clarification, having a strength of 30 to 40° Bé. and preferably about 36° Bé. and an alkalinity factor above 1.06, suitably from 1.075 to 1.10. This concentrated solution or liquor containing trisodium phosphate is then clarified, filtered and crystallized as described in the Lindberg et al. application above referred to. The mother liquor drawn off from the crystals, which may suitably be of 20 to 25° Bé. is utilized in the preparation of the leaching liquor for leaching the reaction product from the heating of the ferro-phosphorus and alkali carbonate.

The iron oxide residue deposited from the solution formed on leaching the clinker or reaction mixture from the furnace is washed with water or preferably with the weak liquor derived from a later washing of the iron oxide residue, to which may be added the dilute liquor secured by washing the material thrown out in the centrifugal clarifier above referred to. The wash liquor is employed in such proportions as to be, after the washing operation, of a Baumé gravity ranging from 10 to 15°. and generally from 12 to 14°. This first wash liquor is mixed with the mother liquor and caustic soda solution, as hereinbefore described, to form the liquor for leaching the reaction mixture from the furnace.

After the first washing, the iron oxide residue is again washed with a small amount of water to remove any residual phosphate before the iron oxide is discarded from the system. The resulting second or weak wash liquid may have a Baumé gravity up to 5° and is in general from 1 to 3°. A portion of this weak or second wash liquor may be utilized, as hereinafter described, to admix with the ferro-phosphorus and sodium carbonate in order to prevent segregation thereof. The major portion of the second or weak wash liquor, however, is employed in the first washing of the iron oxide residue from the initial leaching of the reaction mixture from the furnace.

Although reference has been made herein to the utilization of sodium carbonate in the reaction mixture, other alkali metal carbonates, such as potassium carbonate may be employed, as may equivalent oxygen—yielding or phosphate forming alkali metal compounds, such as the caustic alkalies or alkali metal sulfates, which may be substituted in part or in whole for the alkali metal carbonates, with such changes in reaction temperatures in the furnace as may be required.

By employing my improved process for the conversion of ferro-phosphorus into trisodium phosphate, the chemical control of the manufacturing process may be substantially improved and undesirable reversible reactions during the leaching operation prevented. Furthermore, a process is provided which is adequate to compensate for wide variations in the composition of the reaction mixture or clinker.

While this invention has been described in considerable detail and specific examples have been given, it will be understood that such examples should be construed as illustrative and not by way of limitation. Other modifications of this invention will be apparent to those skilled in the art without departing from the spirit and scope thereof. It is, therefore, desired that only such limitations shall be imposed as are indicated in the appended claims.

I claim:

1. In the method of converting ferro-phosphorus into useful phosphate products wherein comminuted ferro-phosphorus is admixed with alkali metal carbonate, the mixture heated to reaction temperature, and the resulting reaction mixture leached to dissolve alkali metal phosphate, the step of forming a strongly alkaline leaching liquor which comprises admixing alkali with an alkali metal phosphate solution and adding the reaction mixture to said leaching liquor.

2. In the method of converting ferro-phosphorus into useful phosphate products wherein comminuted ferro-phosphorus is admixed with alkali metal carbonate and the mixture heated to reaction temperature, the step which comprises discharging the hot reaction mixture into a leaching liquor containing a quantity of caustic soda sufficient to secure in the resulting liquor an alkalinity greater than that of trisodium phosphate.

3. In the method of converting ferro-phosphorus into useful products wherein comminuted ferro-phosphorus is admixed with alkali metal carbonate and the mixture heated to reaction temperature, the step which comprises discharging the hot reaction mixture into a leaching liquid containing sufficient excess alkali to secure in the resulting liquor an alkalinity factor of above 1.06.

4. In the conversion of ferro-phosphorus into useful products, heating ferro-phosphorus with an alkali metal carbonate to form phosphates, leaching the reaction mixture in a liquid containing free caustic soda, removing the resulting liquor, centrifuging it to remove solids, and filtering the liquor and crystallizing a portion of the phosphates therefrom.

5. In the conversion of ferro-phosphorus into useful products, heating ferro-phosphorus with an alkali metal carbonate to form phosphates, leaching the reaction mixture in an alkaline medium containing sufficient caustic soda to provide, in the final liquor, 1 to 2% caustic soda in excess of that contained in a solution of trisodium phosphate of the same $P_2O_5$ content as the final liquor, removing the resulting liquor, centrifuging it to remove solids and filtering the liquor and crystallizing a portion of the phosphates therefrom.

6. In the conversion of ferro-phosphorus into useful products, heating ferro-phosphorus with an alkali metal carbonate to form phosphates, leaching the reaction mixture in an alkaline medium having an alkalinity factor of about 1.08, to form a phosphate solution, removing the resulting liquor, centrifuging it to remove solids, and filtering the liquor and crystallizing a portion of the phosphates therefrom.

7. In the conversion of ferro-phosphorus into useful products, heating ferro-phosphorus with an alkali metal carbonate to form phosphates, leaching the reaction mixture in an alkaline medium having an alkalinity factor which is greater than the alkalinity factor of the reaction mixture, to form a phosphate solution, removing the resulting liquor, centrifuging it to remove solids, and filtering the liquor and crystallizing a portion of the phosphates therefrom.

8. In the method of converting ferro-phosphorus into useful phosphate products wherein comminuted ferro-phosphorus is admixed with alkali metal carbonate, the mixture heated to reaction temperature, and the resulting reaction mixture leached to dissolve alkali metal phosphate, the steps of forming a strongly alkaline leaching liquor which comprises admixing sodium hydroxide with an alkali metal phosphate solution and adding the reaction mixture to said leaching liquor.

9. In the method of converting ferro-phosphorus into useful phosphate products wherein comminuted ferro-phosphorus is admixed with alkali metal carbonate and the mixture heated to reaction temperature, the step which comprises discharging the hot reaction mixture into a leaching liquor containing a quantity of alkali sufficient to secure in the resulting liquor an alkalinity factor greater than that of trisodium phosphate.

10. In the method of converting ferro-phosphorus into useful products, wherein comminuted ferro-phosphorus is admixed with alkali metal carbonate and the mixture heated to reaction temperature, the step which comprises discharging the hot reaction mixture into a leaching liquid containing sufficient excess alkali to secure in the resulting liquor an alkalinity factor of 1.075 to 1.10.

11. In the method of converting ferro-phosphorus into useful products, wherein comminuted ferro-phosphorus is admixed with alkali metal carbonate and the mixture heated to reaction temperature, the step which comprises discharging the hot reaction mixture into a leaching liquid containing sufficient excess alkali to secure in the resulting liquor an alkalinity factor of above 1.08.

12. In the conversion of ferro-phosphorus into useful products, heating ferro-phosphorus with an alkali metal carbonate to form phosphates, leaching the reaction mixture in a liquid containing free alkali, removing the resulting liquor, centrifuging it to remove solids, and filtering the liquor and crystallizing a portion of the phosphates therefrom.

HOWARD ADLER.